United States Patent [19]

Böttcher et al.

[11] Patent Number: 5,525,698
[45] Date of Patent: Jun. 11, 1996

[54] POLYMERIZABLE EPOXIDE MIXTURES AND PROCESS

[75] Inventors: Axel Böttcher; Egon Uhlig, both of Jena; Manfred Fedtke, Merseburg; Manfred Döring, Jena; Klaus Dathe, Jena; Bernd Nestler, Jena, all of Germany

[73] Assignee: Rutgerswerke AG, Germany

[21] Appl. No.: 313,721

[22] Filed: Sep. 27, 1994

Related U.S. Application Data

[62] Division of Ser. No. 204,782, Mar. 2, 1994, Pat. No. 5,395,913, which is a continuation of Ser. No. 953,517, Sep. 29, 1992, abandoned, which is a continuation-in-part of Ser. No. 761,885, Sep. 17, 1991, abandoned.

[30] Foreign Application Priority Data

Mar. 9, 1990 [DE] Germany ............... 338525.7
Mar. 9, 1990 [DE] Germany ............... 338526.5

[51] Int. Cl.$^6$ .................................................. C08G 59/68
[52] U.S. Cl. ................... 528/92; 528/93; 528/94; 528/97; 528/107
[58] Field of Search ................... 528/92, 93, 94, 528/97, 103

[56] References Cited

U.S. PATENT DOCUMENTS 3,677,978  7/1972  Dowbenko ............... 528/88
4,116,886  9/1978  Cella ............................ 528/88

FOREIGN PATENT DOCUMENTS 556612  1/1978  U.S.S.R. ..

Primary Examiner—Nathan M. Nutter
Assistant Examiner—Richard Jones
Attorney, Agent, or Firm—Bierman and Muserlian

[57] ABSTRACT

A polymerizable mixture comprising 100 parts by weight of at least one epoxy compound and 0.01 to 50 parts by weight of a metal complex compound of the formula $$ML_xB_y \text{ or } M[SR]_xB_z,$$

wherein M is a metal ion of a metal of main groups II and III and sub-groups thereof of the Periodic Table, L is a chelate forming ligand selected from the group consisting of dioximes, α- and β-hydroxycarbonyl compounds or enolizable 1,3-diketones, SR is an acid ion of an inorganic acid, B is a Lewis base, x is an integer from 1 to 8, y is an integer from 1 to 5 and z is an integer from 7 or 8 with the proviso that B is not a polyvalent phenolic compound and a process for the polymerization thereof.

19 Claims, No Drawings

POLYMERIZABLE EPOXIDE MIXTURES AND PROCESS

PRIOR APPLICATION

This application is a division of U.S. patent application Ser. No. 204,782 filed Mar. 2, 1994, now U.S. Pat. No. 5,395,913 which is a continuation of U.S. patent application Ser. No. 953,517 filed Sep. 29, 1992 which is a continuation-in-part of U.S. patent application Ser. No. 761,885 filed Sep. 17, 1991 both now abandoned.

STATE OF THE ART

It is known that Lewis bases such as imidazoles are very reactive accelerators of polymerization reactions of materials containing epoxide or oxirane groups (Ricciardi, et al., J. Polym. Sci. Polym, Chem., 1983, Vol. 21, page 1475 to 1490, Farkas, et al., J. Appl. Polym. Sci. 1968, Vol. 12, page 159 to 168). A disadvantage of these solutions was found to be especially the strong temperature increase during the polymerization process which leads to undesired discoloration of the polymer compositions and to inhomogenities within the polymer compositions.

Such a temperature increase occurs also when an adduct is produced from imidazole or from substituted imidazoles and the epoxide compound as described in U.S. Pat. No 4,487,914, which jointly with a metal salt is reacted to a precondensed resin-like product and is used as a hardener.

In DE-OS 2,819,428, a possibility is indicated for moderating the great reactivity of the employed Lewis bases to polymerizable epoxide compounds by addition of solvent "from the group methanol, ethanol, or mixtures thereof." The problem with this solution is the need for additional processing steps to remove the solvent after the polymerization as well as the formation of quality-diminishing cavities in the polymer that increase the water absorption capacity of the polymer.

In U.S. Pat. Nos. 3,638,007; 3,792,016; and 4,101,514 and DE 2,003,489, imidazole-metal compounds were examined as to their effect as Lewis base for reactive acceleration of polymerization reactions. These compounds constitute very stable coordination polymers and therefore split off imidazole only at relatively high temperatures which then acts as the Lewis base. Below 170° C., no accelerating effect on the epoxide monomers is observed. The problem with polymerization reactions with epoxides at such high temperatures is the appearance of ring cleavage products which bring about a poor lattice structure and thus cause negative polymer properties such as shrinkage, water absorption, etc.

By the use of auxiliary bases, it is possible to moderate the temperatures and hence to control the acceleration. Using such auxiliary bases, however, has the following disadvantages; high economic burdens as these auxiliary bases are very expensive and the possibility that the auxiliary bases themselves will react with the epoxide systems.

In U.S. Pat. No. 3,677,978, the use of imidazole complexes of a variety of metal salts as latent accelerators is described, e.g. complexes $CuCl_2$, $CuSO_4$, $NiCl_2$ and $CoCl_2$ which contain 6 moles of imidazole per mole of metal salt. The disadvantage here is the high gelation temperature of about 160° to 260° C. which leads to inhomogenities and black coloration and the non-homogeneous solubility of the reaction mixture to be polymerized.

Also in U.S. Pat. No. 3,553,166, the use of imidazole complexes as well as of an additional nitrogen-containing compound for the hardening of epoxy resins is set forth but the required processing temperature is again about 180° C.

Also known is the conversion of imidazoles to latent hardeners and accelerators by salt formation with different acids such as polycarboxylic acid (U.S. Pat. No. 3,746,686), isocyanuric acid (U.S. Pat. No. DE 2,811,764), phosphoric acid (U.S. Pat. Nos. 3,632,427; 3,642,698; 3,635,894). The special problems with these solutions is the high toxic action of the imidazole compounds, the early termination of polymerization due to the presence of anions connected therewith and the appearance of an increased monomer component in the polymeric epoxide and such parameters as exudation and increased water absorption.

U.S. Pat. No. DE 2,019,816 and U.S. Pat. No. 4,137,275 disclose the use of acetyl acetonato complexes for the polymerization of epoxide compounds also in the presence of carbonic acid anhydride but the disadvantage of these solutions is again the high processing temperature of 150° C. Besides the above cited problems with polymerization reactions with epoxides at such high temperatures, this means that it leads to tremendous processing costs and greatly limits the range of application.

U.S. Pat. No. DE 2,525,248 describes as an example Cr $(acac)_3$ wherein acac is acetyl acetonate as a hardener system for epoxy resin compositions and the disadvantage here is that in addition to the oxirane oxygen compound, a labile hydrogen compound must be present to obtain polymerization or curing. Another disadvantage of such mixtures is that .often the polymerization begins immediately after the addition of hardener and therefor storable polymer mixtures cannot be guaranteed.

U.S. Pat. No. 4,473,674 teaches the use of a Co(III)-acetylacetone as a hardener constituent for epoxy resins. As the acetyl acetonate is used in the presence of a solvent as well as of an aromatic diamine and of a phenol novolac, the curing must be conducted at great expense so that the solvent can be released and the curing occurs only at a correspondingly higher temperature. In fact, degasing occurs in the first step at elevated temperature under vacuum in a period of 45 to 55 minutes. Thereafter, the temperature is raised under normal pressure over several hours to the hardening temperature of 150° C., then post curing for another two or three hours at 175° to 177° C. without impairing the product quality.

The acetylacetonato hardening catalysts for epoxy resins described by U.S. Pat. No. DE-A 2,334,467 are as can be seen in Example 1 thereof, extremely costly to produce and therefore unecomical. Furthermore, the reaction of the single components with one another is not exactly stoichiometrical so that the quality of the respective hardener fluctuates. These hardeners are therefore suitable only for printing inks and coatings, but not for the production of high-grade products.

It has also been tried to lower the reactivity of primary amines which have long been known as hardeners for epoxy resins by complexing. Appropriate diamine complexes known from CH-A 629,230 as can be seen from Table I have very high start-up temperatures (120° C.) and very long postcuring times (3 hours), even at relatively high temperatures.

The complex aromatic amines known from U.S. Pat. No. 3,310,602 are latent hardeners. As can be seen from the examples, for fast, economical curing of the resins, the temperature must be raised to 150° C. which leads to the same disadvantages described above, The same applies to the aminophenol complexes known from U.S. Pat. No. 3,367,911 which cure only at about 150° C. (300° F.).

The general problem in the use of imidazoles as accelerators consists inter alia in that when they are used whether in a free or bound form, complete through-hardening occurs immediately. For this reason, only two states of the resin composition exist—unpolymerized and completely cross-linked. While this ensures its use as molding and layer material with optimum gelation times which can also be varied depending on the type of imidazole used, it is however not possible after the accelerator has been added to provide a reaction phase of slow hardening and connected therewith an individual processing phase, for example an adjusting phase when fitting in parts to be glued or bonded before the actual hardening phase.

OBJECTS OF THE INVENTION

It is an object of the invention to provide a process for the polymerization of epoxide compounds with a Lewis base which makes possible the production of cost-effective, ecophile and non-toxic epoxy resin compositions with optimum gelation times on the basis of metal complexes.

It is another object of the invention to provide polymerizable mixtures of epoxides and a Lewis base and the polymerized products thereof.

These and other objects and advantages of the invention will become obvious from the following detailed description.

THE INVENTION

The novel polymerizable mixtures of the invention are comprised of 100 parts by weight of at least one epoxy compound and 0.01 to 50 parts by weight of a metal complex compound of the formula $$ML_xB_y \text{ or } M[SR]_xB_z$$

wherein M is a metal ion of a metal of main groups II and III and subgroups thereof of the Periodic Table, L is a chelate forming ligand selected from the group consisting of dioximes, α- and β-hydroxycarbonyl compounds or enolizable 1,3-diketones ligand, SR is an acid ion of an inorganic acid, B is a Lewis base, x is an integer from 1 to 8, y is an integer from 1 to 5 and z is an integer from 7 or 8 with the proviso that B is not a polyvalent phenolic compound.

As epoxide compounds, there may be used all epoxide compounds with more than one epoxide bond. Preferred epoxide compounds are polyphenol-glycidyl ethers, e.g. epoxidized novolaks or the reaction products of epichlorohydrin and Bisphenol A or Bisphenol F. Such epoxy resins have an epoxide equivalent of 160 to 500. The above polyfunctional epoxide compounds which includes epoxy resins can be polymerized singly or in mixtures and optionally in the presence of solvents. They can be used also in mixtures with monoepoxides (so-called reaction diluents).

As metals, in principle all metal ions can be used, particularly the ions of the second and third main groups of the periodic Table of elements, as well as the metal ions of the sub-group elements thereof. Preferred metal ions are cobalt, nickel, iron, zinc or manganese ions.

The ligands may be either chelate-forming ligands which are organic compounds containing at least two atom groups which act as electron donors such as dioximes, α- and β-hydroxycarbonyl compounds, or also enolizable 1,3-diketones. Preferred chelate ligands are acetyl acetone, benzoyl acetone or dipivaloyl methane malonic acid diesters or dinitriles, acetoacetic acid esters or cyanoacetic acid esters.

As acid ions (SR), any acid radical of an inorganic acid can be used.

As Lewis base (B) for the metal complex compounds to be employed, all nucleophilic molecules or ions with a lone electron pair are suitable. Examples are pyridine or imidazole compounds, ethers including cyclic ethers such as tetrahydrofuran, alcohols, ketones, thioethers or mercaptans, except phenolic compounds.

Lewis bases may be in complexes of the formula $ML_xB_y$, but also CH-acid compounds present as Lewis bases, i.e. CH-acid compounds in which one proton is split off. Examples of such CH-acid bases are CH acid pyridines or imidazoles.

The charge equalization of the metal cations of the metal complex compounds to be used can take place through the ligands as well as through ionic Lewis bases. Naturally, the number of charge-carrying ligands is reduced when the complex contains ionic Lewis bases.

Another variant of the complexes of the invention consists in that the CH-acid Lewis bases are bound to the metal-chelate compound by nitrogen and/or oxygen and/or sulfur and/or phosphorus atoms or hydrogen bridges. These metal complex compounds are obtained in a manner known per se by reaction of the respective metal salts with the desired ligands and Lewis bases.

Especially suitable metal complex compounds are the following metal complexes: Sis(acetylacetonato)-cobalt-II-diimidazole, bis(acetylacetonato)-nickel-II-diimidazole, bis(acetylacetonato)-zinc-II-diimidazole, bis(acetylacetonato)-manganese-II-diimidazole, bis(acetylacetonato)-iron-II-diimidazole, bis(acetylacetonato)-cobalt-II-di(dimethylimidazole), bis(acetylacetonato)-cobalt-II-dibenzimidazole, bis(acetato)-cobalt-II-diimidazole, bis[2-ethylhexanato]-cobalt-II-diimidazole, and bis(salicylaldehydo)-cobalt-II-diimidazole.

According to the process of the invention, the complexes are mixed with the epoxide compounds at a temperature below the initiation temperature, i.e. preferably in the range from room temperature to 50° C. In this range, the mixtures are storable and can be processed to molding or pouring compositions, adhesive mixtures or prepregs. Hardening of the epoxide compound then occurs through energy supply, with the temperature rising above the initiation temperature of the complexes. The supply of energy can occur in the form of thermal energy, light, microwaves, radiation, laser energy, etc.

The advantages of the invention derive essentially from the fact that a possibility is given to dissolve the metal complex in the polymerizable epoxide compound, or respectively in the polymerizable epoxide mixture below the polymerization initiation temperature, so that homogeneous polymer compositions result and when using e.g. benzoylacetone or dipivaloylmethane as the ligand, the polymer compositions can be transparent, and when using acid ions such as sulfates, nitrates, halides, phosphates etc., they can be colored. Moreover, no solvents need be used to moderate the reactivity of the Lewis bases which means there is no need for additional processing steps for the removal of the solvent, thereby no, quality-diminishing cavities form in the polymer. Connected therewith, no increased water absorption capacity of the polymer is observable and for the imidazole compounds acting as initiators which in themselves are poisonous, no toxic action is observable. The splitting of the Lewis base metal compound takes place at temperatures above room temperature, preferably between 50° and 140° C.

Such "one-component systems" consisting of monomers and metal complex call be stored for any length of time below the polymerization initiation temperature and can be shaped, being hardened only by reaching the initiation temperature. Use of the metal complexes with the polymerizable compound is possible with or without addition of further additives (e.g. hardeners), i.e. the polymer mixtures are multivariable.

The start of polymerization, i.e. the initiation temperature, is determinable by the selection of the ligands, the selection of the Lewis bases, or the selection of the acid ions, complexes with anions react at lower temperatures than complexes with chelate ligands. The use of substituted Lewis bases, e.g. alkylated imidazoles, also effects the initiation temperature and it is then lower than with the use of imidazole as Lewis base. By suitable selection of the complexes according to type of ligands, Lewis bases and metal, the polymerization initiation temperature can be varied in a wide range.

Surprisingly, the reaction between the initiator and the polymerizable compound occurs at clearly lower temperatures than would be expected on the basis of complex decomposition temperatures known from the literature. Furthermore, in the polymerization of epoxide compounds by means of the metal-complex compounds of the invention, one achieves, in addition to optimum gelation times, a reduced water absorption capacity and acetone absorption as compared with the use of pure Lewis bases such as imidazole Additional advantages of the invention consist in that polymerization occurs preferably between 50° and 140° C. that these "one component systems" can be shaped below the polymerization initiation temperature after a storage time of any length and are hardened only by the initiation temperature being reached, and that for the imidazole compounds acting as initiators, which in themselves are poisonous, no toxic effect is observable. With this solution, it becomes possible to produce cost-effective, ecophile and non-toxic latent epoxy resin compositions having optimum gelation times on the basis of metal complex compounds.

Because of their properties, these mixtures, possibly after addition of fillers and additives known per se, are suitable for the production of bonding and sealing compositions. They serve as binders for molding compositions, in particular for large molded parts which harden stress-free.

Despite the ion-containing metal complex compounds, the epoxide compounds polymerized by the invention have excellent electrically insulating properties. Therefore, the mixtures are suitable for the production of high-grade electric circuit boards and as binders for sealing compositions, particularly for the electric and electronic sector. Moreover, they are used in the production of high-performance composite materials where, due to low temperature peaks during the polymerization, they provide for stress-free bonding. The epoxide compounds are universally usable bonding, coating, and molding compositions for medicine, environmental protection, but in particular for the adjustment of adhesive parts in the optical industry can be produced. In addition, the solvent-free production of epoxy resin compositions is achieved.

In the following examples, there are described several preferred embodiments to illustrate the invention. However, it should be understood that the invention is not intended to be limited to the specific embodiments.

EXAMPLES 1 TO 8

In each example, 1 mole of the epoxide compounds set forth in the following Table was mixed at room temperature with 0.05 mole of the metal complex compound and the mixture was divided into 100 g batches to determine the gelation time by DIN 16945, para 6.3 (Process A). A portion of the mixture was poured and polymerized to obtain test specimens for the determination of water absorption and aceone-absorption. The remainder of the mixture was stored at room temperature for more than 6 months after which no polymerization was observable. In the Table, I is imidazole, MI is 2-methylimidazole, RT is room temperature and Tg is glass transition temperature determined by DIN 16946.

The percent of water absorption of the polymerized epoxide was determined after heating at 100° C. for two hours and the percent of acetone absorption was determined after heating at reflux for two hours. The gelation time was a function of the temperature. The results are reported in the following Table.

TABLE

| Example | Epoxide compound | Metal complex compound | Temperature °C. | Gelation time min | Water absorption % | Acetone absorption % | Tg °C. |
|---|---|---|---|---|---|---|---|
| 1 | Diglycidyl ether of Bisphenol-A | Co(benzoyl acetonato)$_2$I$_2$ | 80<br>100<br>120 | no gelation<br>10-firm<br>8-firm | 0.5 | 1.2 | |
| 2 | N.N.N'N'-tetra glycidyldiamino-diphenyl methane | Co(benzoyl-acetonato)$_2$I$_2$ | 80<br>100<br>120 | no gelation<br>15-firm<br>4-firm | 0.2 | 0.3 | |
| 3 | Diglycidyl ether of Bisphenol-A | Co(benzoyl-acetonato)$_2$MI$_2$ + 0.3 mole diaminodi-phenyl methane | 100<br>120 | 3 h<br>13-firm | 0.3 | 0.35 | |
| 4 | Diglycidyl ether of Bisphenol-A | I$_8$CoSO$_4$ | 50<br>60<br>70 | 20<br>11<br>2 | no measurement | | |
| 5 | Diglycidyl ether of Bisphenol-A | I$_8$CoCl$_2$ | 70<br>80<br>90 | 45<br>28<br>1 | no measurement | | |
| 6 | Diglycidyl ether of Bisphenol-A | Co(acetylacetonoto)$_2$I$_2$ Ni(acetylacetonato)$_2$I$_2$ Co(acetato)$_2$I$_2$ | RT<br>80<br>100<br>120 | no gelation<br>145-firm<br>10-firm<br>6-firm | 0.5 | 1.2 | 164 |

TABLE-continued

| Example | Epoxide compound | Metal complex compound | Temperature °C. | Gelation time min | Water absorption % | Acetone absorption % | Tg °C. |
|---|---|---|---|---|---|---|---|
| 7 | Diglycidyl ether of Bisphenol-A | Ni acetyl acetonato$_2$I$_2$ | Rt<br>80<br>100<br>120 | no gelation<br>165-firm<br>12-firm<br>6-firm | 0.2 | 0.3 | 159 |
| 8 | Diglycidyl ether of Bisphenol-A | Co acetato$_2$I$_2$ | RT<br>60<br>80<br>90 | no gelation<br>90-firm<br>20-firm<br>2-firm | 0.3 | 0.35 | 153 |

Various modifications of the compositions and processes of the invention may be made without departing from the spirit or scope thereof and it is to be understood that the invention is intended to be limited only as defined in the appended claims.

What we claim is:

1. In a process for polymerizing epoxy compounds using a Lewis base, the improvement comprises effecting the polymerization of the presence of 0.01 to 50 parts by weight per 100 parts by weight of the epoxy compound of a Lewis base which is in the form of complex of formula $$ML_xB_y$$

wherein M is a metal ion of a metal of main groups II and III and sub-groups thereof of the Periodic Table, L is a chelate forming ligand selected from the group consisting of dioximes, α- and β-hydroxycarbonyl compounds or enolizable 1,3-diketones, B is a Lewis base, x is an integer from 1 to 2 and y is an integer from 1 to 5 with the proviso that B is not polyvalent phenolic compound.

2. The process of claim 1 wherein the ligand is selected from the group consisting of acetyl, acetone dipivalolyl methane or benzoyl acetone.

3. The process of claim 1 wherein the ligand is acetyl acetone or an aliphatic or aromatic carboxylic acid.

4. The process of claim 1 wherein the metal ion is selected from the group consisting of cobalt, nickel, iron, zinc and manganese ions.

5. The process of claim 1 wherein the Lewis base is selected from the group consisting of, imidazole, tetrahydrofuran, alcohols excluding phenolic compounds, ketones, thioethers and mercaptans.

6. The process of claim 1 wherein the Lewis base is selected from the group consisting of, malonic acid diesters or dinitriles, acetoacetic acid esters, cyanoacetic acid esters and nitromethane.

7. A polymerizable mixture comprising 100 parts by weight of at least one epoxy compound of 0.01 to 50 parts by weight of a metal complex compound of the formula $$ML_xB_y$$

wherein M is a metal ion of a metal of main groups II and III and sub-groups thereof of the Periodic Table, L is a chelate forming ligand selected from the group consisting of dioximes, α- and β-hydroxycarbonyl compounds or enolizable 1,3-diketones, B is a Lewis base, x is an integer from 1 to 2 and y is an integer from 1 to 5, with the proviso that B is not a polyvalent phenolic compound.

8. The mixture of claim 7 containing 1 to 10 parts by weight of the metal complex.

9. The composition of claim 7 wherein the ligand is selected from the group consisting of acetyl acetone, dipivaloyl methane or benzoyl acetone.

10. The composition of claim 7 wherein the ligand is acetyl acetone or an aliphatic or aromatic carboxylic acid.

11. The composition of claim 7 wherein the metal ion is selected from the group consisting of cobalt, nickel, iron, zinc and manganese ions.

12. The composition of claim 7 wherein Lewis base is selected from the group consisting of, imidazole, tetrahydrofuran, alcohols excluding phenolic compounds, ketones, thioethers and mercaptans.

13. The composition of claim 7 wherein the Lewis base is selected from the group consisting of, malonic acid diesters or dinitriles, acetoacetic acid esters, cyanoacetic acid esters and nitromethane.

14. A bonding and sealing composition containing as the bonding and sealing agent the mixture of claim 7.

15. A molding composition containing a mixture of claim 7 as the binder.

16. An high-grade electric circuit board made of a polymerized mixture of claim 7.

17. High performance composite materials bonded with a polymerized mixture of claim 7.

18. The process of claim 1 wherein the Lewis base is imidazole or an alkylated imidazole.

19. A mixture of claim 7 wherein the Lewis base is imidazole or an alkylated imidazole.

* * * * *